United States Patent [19]

Matsubara

[11] 4,134,617
[45] Jan. 16, 1979

[54] DRIVER'S SEAT MOUNTING STRUCTURE FOR A TRACTOR

[75] Inventor: Yoshitaka Matsubara, Osaka, Japan

[73] Assignee: Kubota, Ltd., Osaka, Japan

[21] Appl. No.: 808,523

[22] Filed: Jun. 21, 1977

[30] Foreign Application Priority Data

Jun. 25, 1976 [JP] Japan .............................. 51-84539[U]
Jun. 26, 1976 [JP] Japan .............................. 51-84464[U]

[51] Int. Cl.² .............................................. A47C 3/18
[52] U.S. Cl. ..................................... 297/345; 297/349
[58] Field of Search ...................... 297/349, 345, 346; 248/421

[56] References Cited

U.S. PATENT DOCUMENTS

| | | | |
|---|---|---|---|
| 2,204,218 | 6/1940 | Hill | 297/349 X |
| 2,833,367 | 5/1958 | Pool et al. | 297/349 |
| 2,946,373 | 7/1960 | McCause | 297/349 X |
| 3,189,312 | 6/1965 | Bilancia | 248/421 X |
| 3,300,172 | 1/1967 | Noller et al. | 297/349 X |
| 3,412,968 | 11/1968 | Rose et al. | 297/349 X |
| 3,622,202 | 11/1971 | Brown | 297/349 X |
| 3,756,654 | 9/1973 | Bauer | 297/345 |

FOREIGN PATENT DOCUMENTS

766073 8/1953 Fed. Rep. of Germany .......... 297/346

*Primary Examiner*—Francis K. Zugel
*Attorney, Agent, or Firm*—Haseltine, Lake & Waters

[57] ABSTRACT

A driver's seat mounting structure for a tractor which carries work implements at the front and the back, and operation units associated with the respective work implements, which units are disposed at different vertical planes, one in front of the driver's seat and the other behind it. The seat is movable between forward facing and rearward facing positions. The seat mounting structure comprises a mounting member to carry the seat for rotation about a vertical axis and for locking it in position. The seat mounting member is attached to the tractor body by a parallelogram link mechanism which is oscillatable and lockable on axes extending transversely of the tractor body. By using this parallelogram link mechanism, the position of the driver's seat is changed in a convenient manner.

3 Claims, 6 Drawing Figures

DRIVER'S SEAT MOUNTING STRUCTURE FOR A TRACTOR

BACKGROUND OF THE INVENTION

The present invention relates to a tractor for use in civil engineering, construction and the like, which tractor carries work implements at the front and the back thereof and operation units associated with the respective work implements and disposed at different vertical planes, one in front of the driver's seat and the other behind it. More particularly, the invention relates to a driver's seat mounting structure adapted to change the driver's seat between a forward facing position and a rearward facing position.

In the case where the front implement is shovel means and the rear implement is backhoe means, for example, the two implements operate differently and the operation unit for the backhoe means is disposed at a higher plane than the operation unit for the shovel means, to enable the driver to have a good view of the work being done by each of the implements. In other words, when working the backhoe means, the operator has to look down from a relatively high position as the place of ground engagement is close to the tractor.

Therefore, when the driver's seat is set in position facing the operation unit for whichever work implement to be worked, it is necessary to bring the seat to the position best suited for manipulation of the operation unit, that is to say a position at the right height and having the right space between the seat and the operation unit.

In satisfying the above conditions for the seat position, the provision of the right space between the seat and each of the units is a difficult question as far as a small size tractor is concerned. A small tractor can hardly afford a large work space for the driver, especially in the longitudinal direction of its body.

In order to solve this problem, various seat mounting structures have been employed in conventional practice. One example of the conventional art sets the swivelling axis of the driver's seat at a front portion thereof to obtain a good distance from each of the operation units, and changes the vertical plane of the seat by means of a hydraulic system or a gearing mechanism.

However, such conventional art generally has a disadvantage of complication in constuction and in changing the position of the seat.

SUMMARY OF THE INVENTION

In view of the above-noted situation, the present invention intends to provide a driver's seat mounting structure simpler in construction and in operation than the known structure.

The driver's seat mounting structure according to the present invention comprises a mounting member to carry the driver's seat for rotation about a vertical axis to fixed in position, and a parallelogram link mechanism to connect the mounting member to the tractor body, the parallelogram link mechanism being oscillatable and lockable on axes extending transversely of the tractor body, whereby the driver's seat is moved forward and rearward and up and down relative to the tractor body to render easy access to each of the operation units.

In this arrangement, the driver's seat is mounted on the tractor body through a parallelogram link mechanism so that the seat is rotated to change its facing directions and be fixed in position. Thus, the forward — rearward change and the upward — downward change of the seat position are effected at the same time by oscillating the parallelogram link mechanism. The parallelogram mechanism per se being simple in construction, the mounting structure of the present invention is simple in construction and in operation.

Particularly, in the arrangement of the present invention, the driver's seat is adapted to move forwardly and rearwardly relative to the tractor body, wherefore it is unnecessary to provide a large space between the seat and each of the operation units. This arrangement is quite useful to a small size tractor with a limited allowance of space for the driver.

DESCRIPTION OF THE PREFERRED EMBODIMENTS

Desired modes of practising the invention are described hereinafter with reference to the accompanying drawings.

Figure 1:
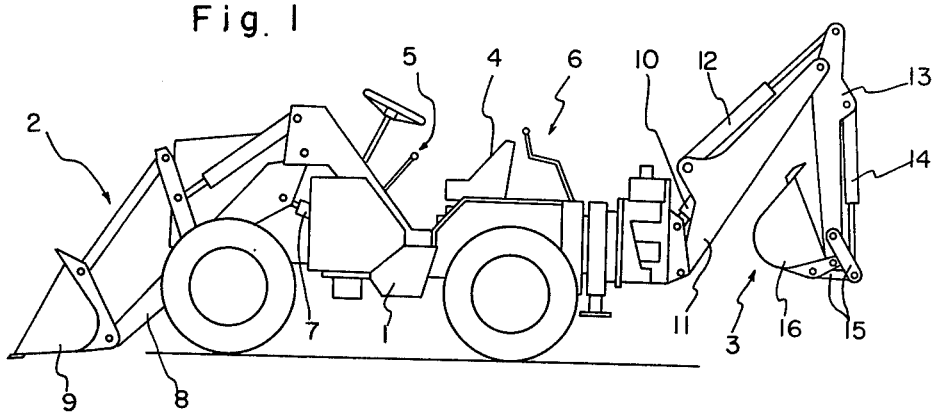
FIG. 1 is a side elevation view of a tractor carrying a driver's seat mounting structure according to the present invention.

FIG. 1 shows a tractor for civil engineering use and the like. The tractor carries, at the front part of a its body 1, shovel means 2 which is one example of work implement, and backhoe means 3 which is another example of a work implement, at the rear end thereof. There is a driver's seat 4 on the tractor body 1. In front of seat 4 is an operation unit 5 including a hand lever which is associated with shovel means 2, and behind seat 4 is a further operation unit 6 including a hand lever which is associated with backhoe means 3. Operation unit 6 is disposed at a higher position than operation unit 5. The reason for this is to enable the driver to obtain a good view of the work being done respectively by shovel means 2 and backhoe means 3.

Shovel means 2 includes a boom 8 adapted to vertically oscillate by the action of a boom cylinder 7 and a shovel 9 coupled to the tip end of boom 8 for vertical oscillation. By manipulating operation unit 5, boom 8 and shovel 9 are vertically oscillated to engage in civil engineering work.

Backhoe means 3 includes a boom 11 rotatable and lockable on a vertical axis at the rear end of tractor body 1 and vertically oscillatable by the action of a boom cylinder 10, an arm 13 pivoted to the tip end of boom 11 and vertically oscillatable by the action of an arm cylinder 12, and a bucket 16 coupled to the tip end of arm 13 via a link mechanism 15 and vertically oscillatble by the action of a bucket cylinder 14. To assume the contained position, the entire backhoe means 3 is made to slide to one side of the tractor body 1 and is rotated about the vertical axis bringing the free end of backhoe means 3 to a position at the other side of tractor body 1. By manipulating operation unit 6, boom 11, arm 13 and bucket 16 are vertically oscillated to engage in civil engineering work.

The driver's seat 4 is adapted to change between a forward facing position and a rearward facing position. In changing the facing positions, seat 4 is moved forward or rearward and upward or downward relative to the tractor body 1, so as to be fixed in position for each of the operation units 5 and 6. To face operation unit 5 for shovel means 2, seat 4 takes a forward facing, rearwardly pulled, lower position. To face operation unit 6 for backhoe means 3, seat 4 takes a rearward facing, forwardly pulled, upper position. In this way, seat 4 is adapted to take a position suitable in height and leaving the right space for the driver to work at each of the operation units.

Figure 2:
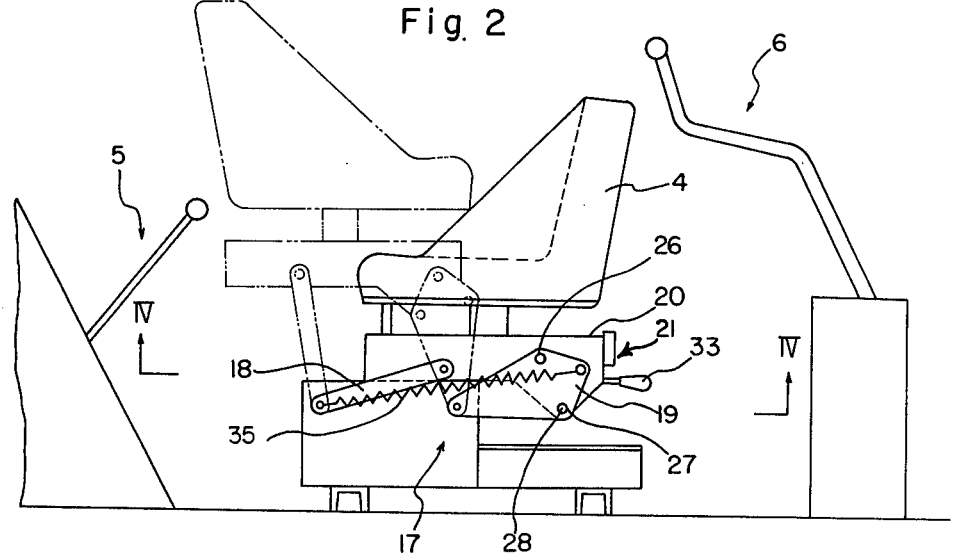
FIG. 2 is an enlarged side view of the seat mounting structure.

The above arrangement is now described in greater detail. As shown in FIG. 2, a seat mounting member 20 is oscillatably mounted on the tractor body 1 through a parallelogram link mechanism 17 comprising a first pair of links 18 and a second pair of links 19, the two pairs of links 18 and 19 being pivoted to tractor body 1 for oscillation about axes extending transversely of tractor body 1. It will be seen that mounting member 20 moves forward relative to the tractor body 1 as it goes upward, and moves rearward relative to the tractor body 1 as it goes downward. Mounting member 20 is provided with a lock mechanism 21 operable to fix mounting member 20 at the upper and lower positions. Accordingly, vertical movement of seat mounting member 20 and locking and unlocking with lock mechanism 21 cause seat mounting member 20 to oscillate about axes extending transversely of tractor body 1 an to be fixed in position.

Figure 3:
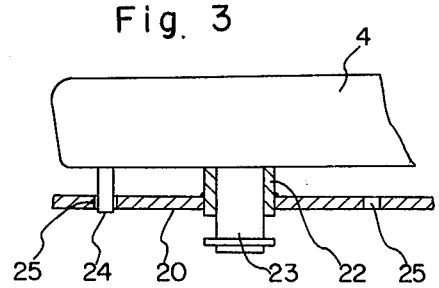
FIG. 3 is a vertical section showing a principal part of the structure of FIG. 2.

Referring to FIG. 3, mounting member 20 is provided with a boss 22 into which a vertical stem 23 rigidly connected to seat 4 fits for relative rotation. Further, a seat fixing pin 24 extends downwardly from seat 4 to engagedly fit into one of two pinholes 25 defined on mounting member 20 axially of boss 22, one pinhole being forwardly and the other rearwardly relative to tractor body 1. Pin 24 is adapted to slip into and out of pinholes 25 as seat 4 is vertically moved relative to mounting member 20. This arrangement makes it possible for seat 4 to turn about the axis of vertical stem 23 to change its facing direction and to be fixed in position by rotating and vertically moving relative to mounting member 20.

Figure 4:
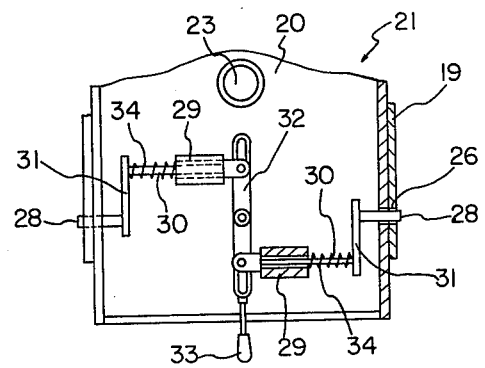
FIG. 4 is a sectional view taken along line IV — IV of FIG. 2.

Lock mechanism 21, as shown in FIG. 2, includes two pinholes 26 and 27 defined on each of the second pair of links 19 axially of the pivot connecting links 19 to mounting member 20. Turning now to FIG. 4, there is a pair of right and left pins 28 provided in mounting member 20. These pins 28, which extend through perforations formed on the side walls of mounting member 20, serve to fix mounting member 20 at an upper position and a lower position by fitting into pinholes 26 and 27 of links 19. Each of pins 28 is integrally connected to one end of a connecting rod 30 through a further connecting rod 31, each connecting rod 30 being slidably fitted in a boss 29 rigidly attached to mounting member 20. The other end of each of connecting rods 30 is pivoted by means of a pin to an elongate opening in a link 32 which is in turn pivoted to mounting member 20. Link 32 has a handle 33 extending from one end thereof outwardly of mounting member 20. Movement of handle 33 transversely of the tractor body 1 causes movement of pins 28 transversely of the tractor body 1, in and out of pinholes 26 and 27. Springs 34 are provided between either pair of connecting rods 31 and bosses 29 to bias pins 28 outwardly of mounting member 20 into pinholes 26 and 27. Mounting member 20 is released from a fixed position by moving handle 33 against the biasing force of springs 34. From the foregoing description, it will be understood that mounting member 20 is fixed at the upper position when pins 28 are fitted into and engage with pinholes 26 and it is fixed at the lower position when pins 28 are fitted into and engage with pinholes 27.

FIG. 2 further shows an expansion spring 35 disposed to extend between the pivot connecting the first pair of links 18 to tractor body 1 and the pivot connecting the second pair of links 19 to seat mounting member 20. This spring 35 helps to ease the raising of seat 4 by biasing mounting member 20 upwardly.

Another embodiment of the present invention is hereinafter described with reference to FIGS. 5 and 6. The following arrangement differs from the thus far described arrangement insofar that manipulation of a single handle effects fixing of the rotatable seat as well as the mounting member. In the other aspects the two arrangements are the same, and the descriptions common therebetween will not be repeated.

Figure 5:
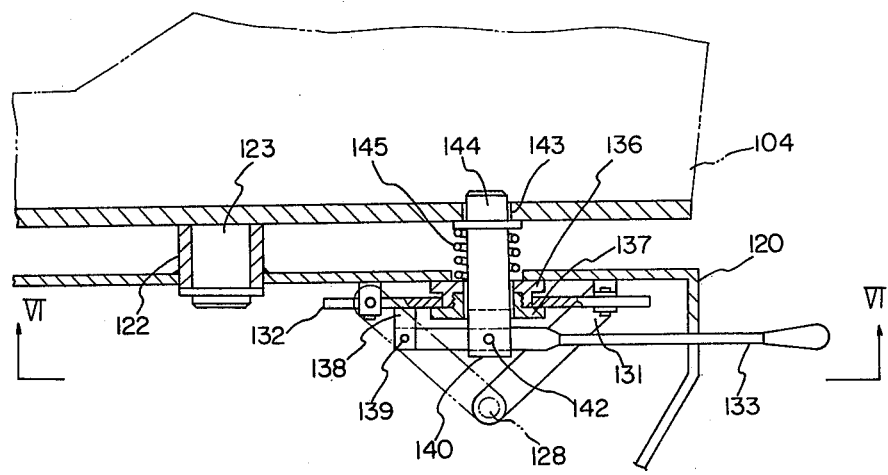
FIG. 5 is a sectional side view of the principal part of another seat mounting structure according to the present invention.

As shown in FIG. 5, a seat mounting member 120 is provided with a boss 122 into which a vertical stem 123 rigidly connected with a seat 104 fits for relative rotation. Thus, seat 104 is rotatable relative to mounting member 120 about the axis of vertical stem 123 to change between a forward facing position and a rearward facing position. Second links 119, which are part of a parallelogram link mechanism (not shown), each have two pinholes 126 and 127 for fixing mounting member 120 at upper and lower positions radially about the pivot connecting links 119 to mounting member 120. There is a pair of right and left pins 128 provided in mounting member 120, pins 128 being adapted to fit into pinholes 126 and 127. Each of pins 128 is integrally connected to one end of a connecting rod 130 through a further connecting rod 131, each connecting rod 130 being slidably fitted in a boss 129 attached to mounting member 120. The other end of each of connecting rods 130 is pivoted by means of a pin in an elongate opening of a link 132 pivoted to a boss 136 attached to mounting member 120. Link 132 is externally fitted with boss 136 and is prevented from falling off by an element 137 screwed on to boss 136. Thus, link 132 is held pivotably about boss 136. Link 132 has a bracket 138 to which one end of a handle 133 is pivoted via a horizontal pin 139 so that handle 133 is oscillatable relative to bracket 138. Handle 133 is, between the ends thereof, received by a cut-off portion 141 defined in a vertical stem 140, and is pivoted by a horizontal pin 142 for oscillation relative to vertical stem 140. Thus, horizontal oscillation of handle 133 about vertical stem 140 causes pins 128 extending through perforations defined on the side walls of mounting member 120 to move horizontally and slip into and out of pinholes 126 and 127. Springs 134 are provided between either pair of connecting rods 131 and bosses 129 to bias pins 128 outwardly of mounting member 120 into pinholes 126 and 127. Accordingly, pins 128 enter and engage with pinholes 126 or pinholes 127 under the biasing force of springs 134, to thereby fix mounting member 120 at the lower position or at the upper position. Oscillating handle 133 acts against the force of springs 134 cause pins 128 to disengage from pinholes 126 or pinholes 127 and to release mounting member from either of the fixed positions. Furthermore, seat 104 has two stopper holes 143 on the undersurface thereof for the purpose of fixing seat 104. Stopper holes 143 are positioned axially of vertical step 123, one forwardly and the other rearwardly relative to the tractor body. A projection 144 adapted to enter and engage stopper holes 143 is integrally mounted on one end of vertical stem 140. Between projection 144 and boss 136 is a spring 145 to bias projection 144 towards stopper holes 143 for engagement therewith. Accordingly, projection 144 enters and engages with each of stopper holes 143 under the biasing force of spring 145 to fix seat 104 either at the forward facing position or at the rearward facing position. Downward oscillation of handle 133 about horizontal pin 139 against the force of spring 145 causes projection 144 to disengage from stopper holes 143 to release seat 104 from the fixed positions.

Figure 6:
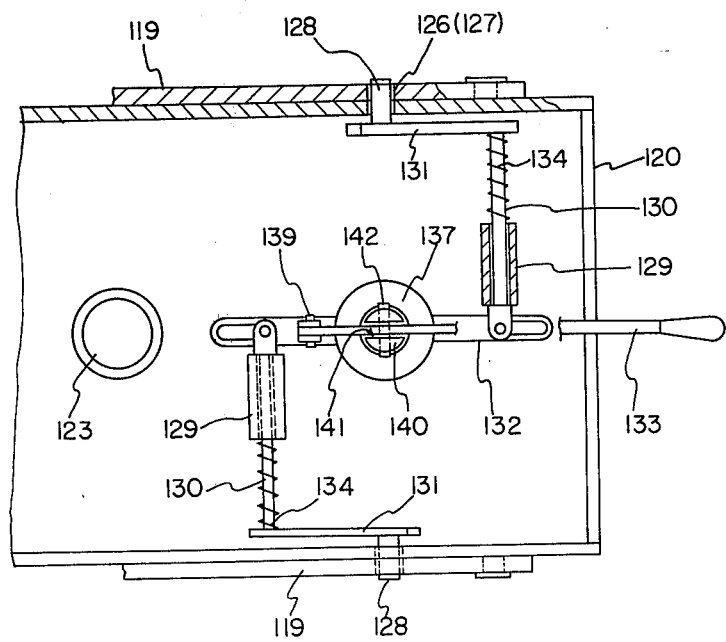
FIG. 6 is a sectional view taken along line VI — VI of FIG. 5.

The arrangement illustrated by FIGS. 5 and 6 has the advantage of facilitating an easy and quick operation in changing the position of driver's seat 104, since oscillation and fixing of the parallelogram mechanism and fixing the positions of seat 104 and release thereof are both carried out by oscillating the single handle 133 horizontally and vertically.

In the described embodiments, it may be still more convenient to have handles 33 and 133 extending both forwardly and rearwardly of seat 104.

What I claim is:

1. In a driver's seat mounting structure for a tractor having a body carrying a first work implement at the front part thereof, a further work implement at the rear part thereof, an operation unit disposed in front of the driver's seat and associated with said first work implement, and a further operation unit disposed behind the driver's seat and associated with said further work implement, said two operation units being positioned at different vertical levels, said driver's seat being turnable between a forward facing position and a rearward facing position, said driver's seat mounting structure comprising a mounting member carrying said driver's seat for rotation about a vertical axis, first locking means for locking said seat relative to said mounting member in forward facing position and rearward facing position, a parallelogram link mechanism connecting said mounting member to the tractor body, said parallelogram link mechanism being oscillatable and lockable on axes extending transversely of the tractor body, whereby said driver's seat is moved forward and rearward and up and down relative to the tractor body to provide easy access to each of said operation units, second locking means for locking said mounting member in an upper position and a lower position, and handle means operatively connected to said first and second locking means for causing said locking means to lock and unlock said mounting member, said handle means being movable in horizontal and vertical planes, the movement of said handle means in one plane being operative to lock and unlock the first locking means and in the other plane to lock and unlock the second locking means.

2. A driver's seat mounting structure as claimed in claim 1 wherein said handle means is operable to lock and unlock said first locking means by oscillating vertically and to lock and unlock said second locking means by oscillating said handle means horizontally.

3. A driver's seat mounting structure as claimed in claim 1 wherein said first locking means comprises a pin, said seat having two axially aligned apertures on opposite sides of the axis of rotation of the seat, said handle being coupled to said pin to raise and lower the same between engaged and disengaged positions with said apertures, said second locking means comprises a first connecting rod slidably and pivotably connected to said handle, a second connecting rod pivotably connected to said first connecting rod, and a laterally projecting pin on said second connecting rod, said mounting member and link mechanism having aligned pairs of holes, said laterally projecting pin being engageable in respective pins of holes with the seat in upper and lower positions.

* * * * *